United States Patent
Hanau

(10) Patent No.: US 7,068,282 B2
(45) Date of Patent: Jun. 27, 2006

(54) COLORATION INDICATIVE OF DRAFT ANGLES

(75) Inventor: Paul Hanau, Portland, OR (US)

(73) Assignee: Autodesk, Inc., San Rafael, CA (US)

( * ) Notice: Subject to any disclaimer, the term of this patent is extended or adjusted under 35 U.S.C. 154(b) by 201 days.

(21) Appl. No.: 10/676,357

(22) Filed: Sep. 30, 2003

(65) Prior Publication Data

US 2005/0068329 A1  Mar. 31, 2005

(51) Int. Cl.
*G09G 5/02* (2006.01)
(52) U.S. Cl. ............... 345/589; 345/586; 700/182; 706/919; 715/964; 249/66.1; 249/127; 249/136; 264/478
(58) Field of Classification Search ............... 156/125; 249/66.1, 127, 136; 264/37.27, 37.33, 297.2, 264/328.1, 453, 478, 645, DIG. 83; 345/582, 345/586, 589, FOR. 108, 210, 211, 212; 425/DIG. 243; 700/182; 706/919; 715/964
See application file for complete search history.

(56) References Cited

FOREIGN PATENT DOCUMENTS

JP          09147144         *   6/1997

OTHER PUBLICATIONS

"Draft properties," http://www.cclabs.missouri.edu/things/instruction/aw/DraftProperties.html, Alias/Wavefront, a Silicon Graphics Company, © 1997.

"Shade a surface with its draft angles," http://www.alias.com/eng/support/studiotools/documentation/Using/View22.html, downloaded Aug. 5, 2004.

"Mold Advisor," Capvidia brochure, http://www.capvidia.be/news/brochures/moldadvisor–brochure.htm artlimb©2001, downloaded Aug 5, 2004.

"Moldplus," MACDAC Engineering online product information, http://web.archive.org/web/20030626124717/http://www.macdac.com/moldplus/moldplu..., Jun. 26, 2003.

"Moldplus," MACDAC Engineering online porduct information, http://www.macdac.com/moldplus/moldplus.htm, downloaded Aug. 5, 2004.

"Overview of QuickConcept®: Case Studies," Berkeley Manufacturing Institute, http://kingkong.me.berkeley.edu/html/DFM%20Website/cimatron–writeup.doc.

"SolidWorks MoldWorks," MLC CAD Systems, http://web.archive.org//20030719040451/http://www.mlc-cad.com/swmoldworks.html, ©2002, Jul. 19, 2003.

(Continued)

*Primary Examiner*—Matthew C. Bella
*Assistant Examiner*—G. F. Cunningham
(74) *Attorney, Agent, or Firm*—Fish & Richardson P.C.

(57) ABSTRACT

An object may be colored to indicate draft angles of a pull direction at various locations of the object. The coloration advantageously employs a color map specifying a color spectrum for a range of trigonometric values of the draft angles.

23 Claims, 7 Drawing Sheets

OTHER PUBLICATIONS

"SolidWorks MoldWorks," MLC CAD Systems, http://www.mlc-cad.com/swmoldworks.html, ©2002.

"Independent Rapid Prototyping Software Providers: Draft Angle Generation for Mold Application," Castle Island Co., http://home.att.net/~castleisland/sw04–lks.htm, Nov. 5, 2003.

"FaceWorks 2004: FaceWorks 2.0 tutorial," Capvidia products, http://web.archive.org/web/20030819100949/http://www.capvidia.be./products/swadd/fw/fw–tutorial.htm, artlim©2001, Aug. 19, 2003.

* cited by examiner $$\begin{matrix} P_x & P_y & P_z \\ 0 & 0 & 0 \\ 0 & 0 & 0 \end{matrix} \quad \begin{matrix} N_x \\ N_y \\ N_z \end{matrix} \equiv \begin{matrix} P_x N_x + P_y N_y + P_z N_z \\ 0 \\ 0 \end{matrix}$$

COLORATION INDICATIVE OF DRAFT ANGLES

TECHNICAL FIELD

The present invention relates to the field of computer aided design (CAD). More specifically, it relates to displaying of a modeled object with coloration indicative of draft angles of a pull direction at various locations of the modeled object.

BACKGROUND

Certain objects, such as plastics and metals, can be manufactured using a mold. For example, an object may be manufactured by injection molding. A mold is first created. Materials, typically in a substantially liquid and raised temperature form, are injected into the mold. When the materials are cooled and return to a solid form, the object may be removed from the mold.

Each mold typically includes multiple sections. The sections are designed to be able to removably mate with each other. Further, the molded object may be removed or "pulled away" from one or more of the mold sections. The direction in which each mold section is pulled away from the molded object is referred to as the "pull direction".

FIG. 1A illustrates a simple sphere 110 and a mold section 120 of a mold employed in the creation of the sphere 110. FIG. 1B illustrates an expanded view of a portion 140 of the mold/sphere interface. The draft angle 150 is defined as the smaller angle between the surface of the sphere (more specifically the tangent 160 to the sphere) and the pull direction 130. Further, typically, the reference coordinate system is "positioned" such that large positive values of the draft angles 150 denote relative ease in "pulling" the mold 120 away from the object 110, draft angle values around 0 denote relative difficulty in "pulling" the mold 120 away from the object 110, and large negative draft values denote virtual "impossibility" in "pulling" the mold 120 away from the object 110. In fact, in the last case, the object 110 may be "pushed" into the mold 120, as opposed to being "pulled" from the mold 120. Thus, information about the draft angles of a pull direction at various locations of a molded object is useful to a designer.

BRIEF DESCRIPTION OF THE DRAWINGS

Embodiments of the present invention will be described referencing the accompanying drawings in which like references denote similar elements, and in which:

FIG. 5 illustrates a vector/matrix transformation for calculating a cosine of an angle between two vectors.

DETAILED DESCRIPTION OF EMBODIMENTS OF THE INVENTION

Figure 1A:
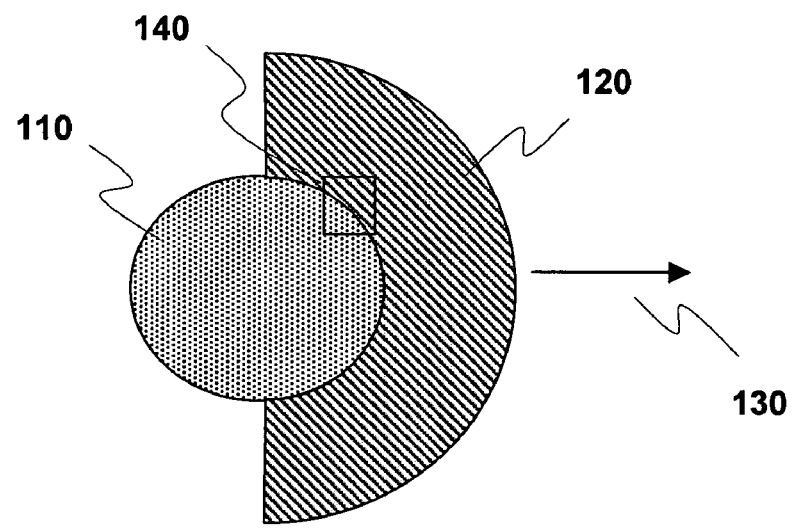
FIGS. 1A and 1B illustrate an object and a mold, including a draft angle relative to a pull direction at a location of the object.
Figure 1B:
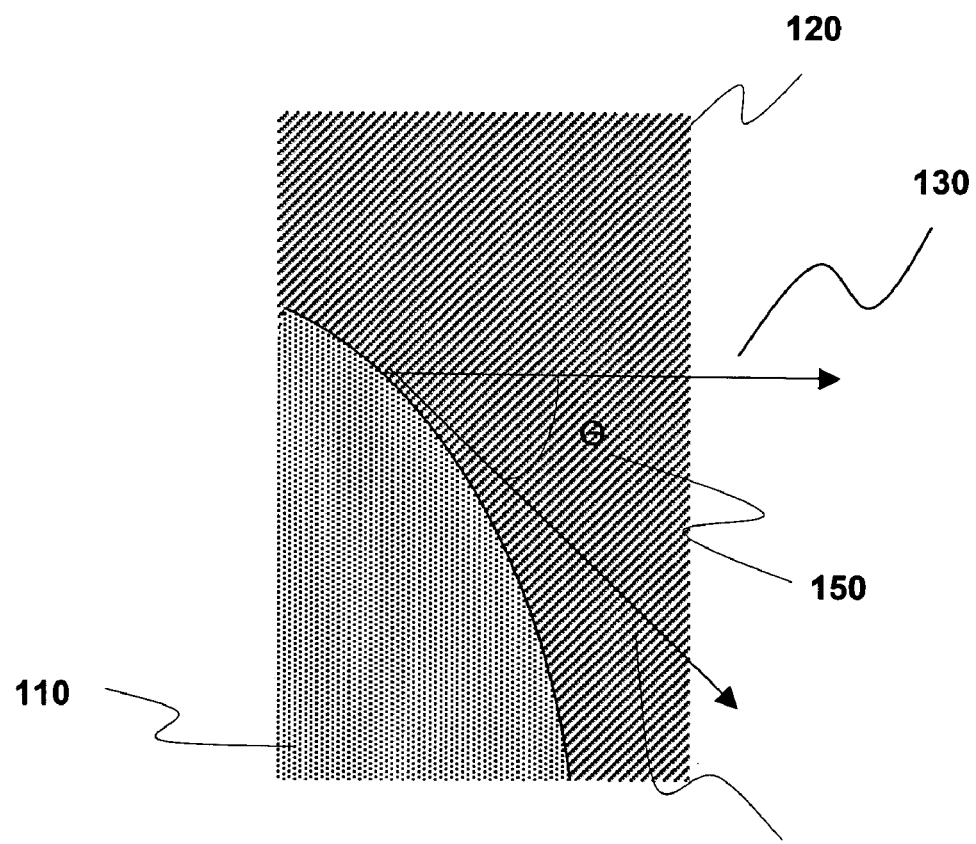

Embodiments of draft angles indication method and apparatus are described herein. In particular, embodiments employing coloration of a molded object to indicate draft angles of a pull direction at various locations of the molded object will be described. Further, embodiments employing a color map that is based on the trigonometric values (such as sine values) of the draft angles will be described, including embodiments that access the color map with the cosine of the "complementary" angles having corresponding right angle relationships with the draft angles.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the embodiments being described.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

To appreciate the present invention, first consider when displaying an object in a Computer Aided Design (CAD) system, if a pull direction is defined, it is beneficial to indicate the draft angles relative to the pull direction at various locations of the object by correspondingly coloring the object. For example, areas with locations having high positive draft angle values (easy to pull the mold away from the object) may be colored with a color at one end of the color spectrum, such as red, areas with locations having close to the draft angle value of zero (difficult to pull) may be colored with a color in the middle of the color spectrum, such as yellow, and areas with locations having high negative draft angle values (impossible to pull) may be colored with a color in the other end of the color spectrum, such as blue.

One possible approach to so color the object to indicate the draft angles relative to the pull direction at the various locations of the object is to calculate the appropriate color at each vertex of each triangle primitive of a mesh employed to model the object, based on the draft angle calculated at each vertex of each triangle primitive. The color to be displayed at other points within each triangle primitive are interpolated based on the colors calculated for the vertices.

However, experience had shown that the resulting color is generally crude, unless a very dense mesh having many more smaller triangle primitives is used. But, the employment of very dense mesh is not always practical, as the computations are likely to be prohibitively intensive. In particular, the computations may be so intensive, rendering it virtually impossible, on even high performance computers, to respond and re-color a molded object in real time to reflect a user change of the pull direction.

Figure 2:
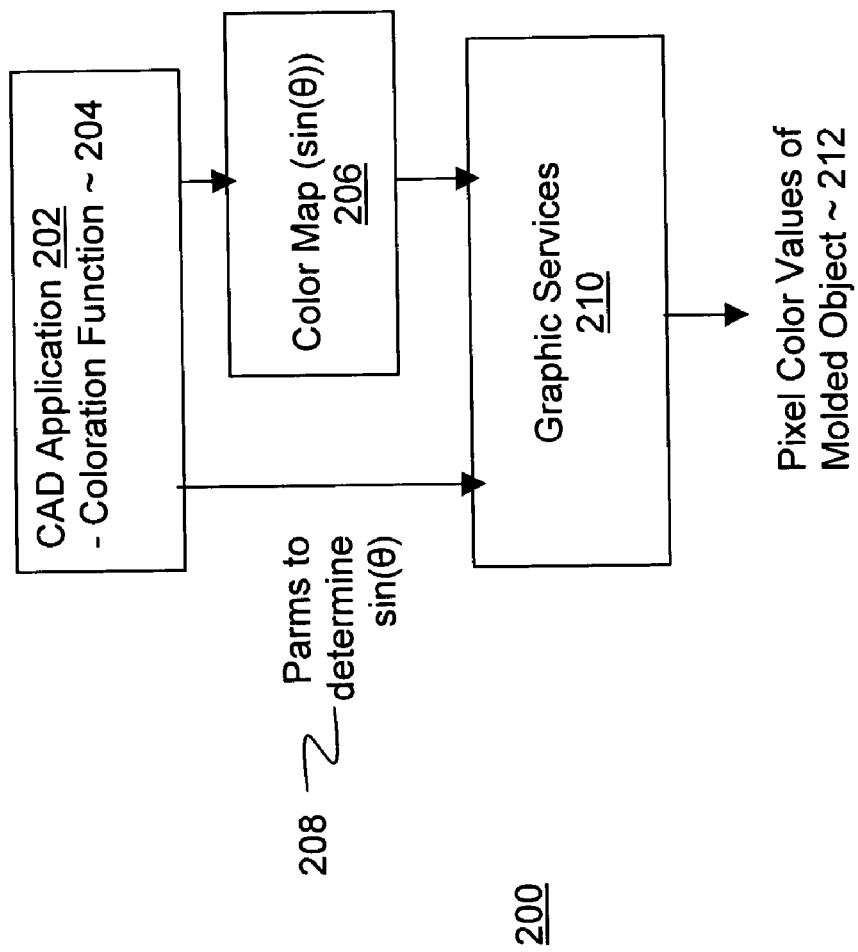
FIG. 2 illustrates an overview of a number of embodiments of the present invention.

FIG. 2 illustrates an overview of the present invention, in accordance with a number of embodiments. As illustrated, for these embodiments, computing environment 200 includes CAD application 202. The computing environment may be a uni or multi-processor computer, a massively parallel computing system, or a cluster of locally or remotely networked computing devices.

CAD application 202, as shown, is advantageously equipped with a coloration function 204 for coloring a modeled object to convey draft angles (θ) of a pull direction at the various locations of the modeled object. The modeled object may be any physical object of manufacture being modeled, e.g. a molded object.

Coloration function 204 is designed to effectuate the coloration through cooperation with graphics services 210, and the employment of a color map 206. In other words, coloration function 204 is designed to effectuate the coloration by providing necessary geometric parameter values to graphics services 210 to employ color map 206 to determine the colors for the pixels of the various locations of the modeled object.

In various embodiments, color map 206 advantageously specifies a spectrum of color, e.g. from blue to yellow to red, for various trigonometric values of the draft angles (θ). In other words, color map 206 may be accessed to provide a color for one or more pixels of a surface location of an object, based on the trigonometric value of the draft angle (θ) of a pull direction at the surface location.

Figure 3A:
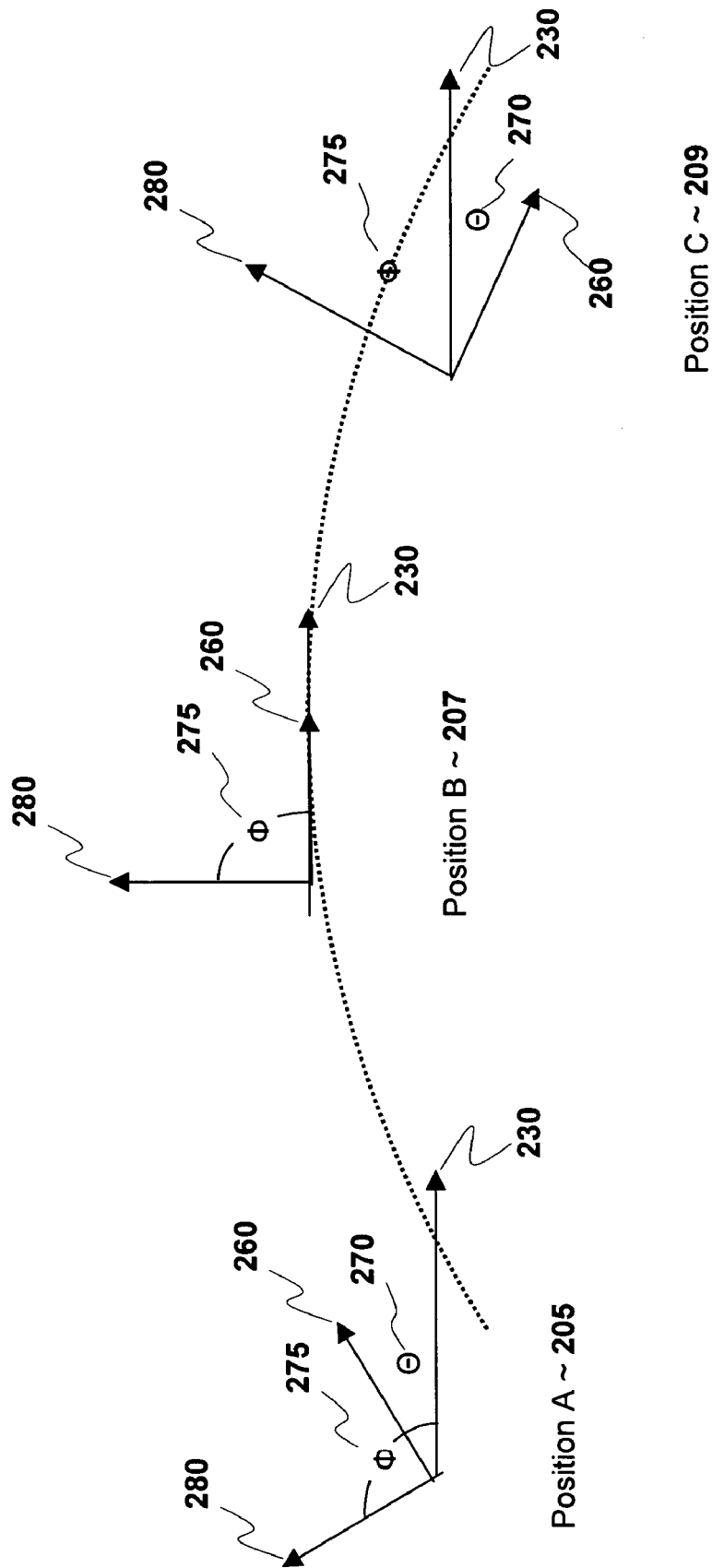
FIG. 3a illustrates a more detailed look at draft angles including their relationships to other geometric parameters.
Figure 3B:
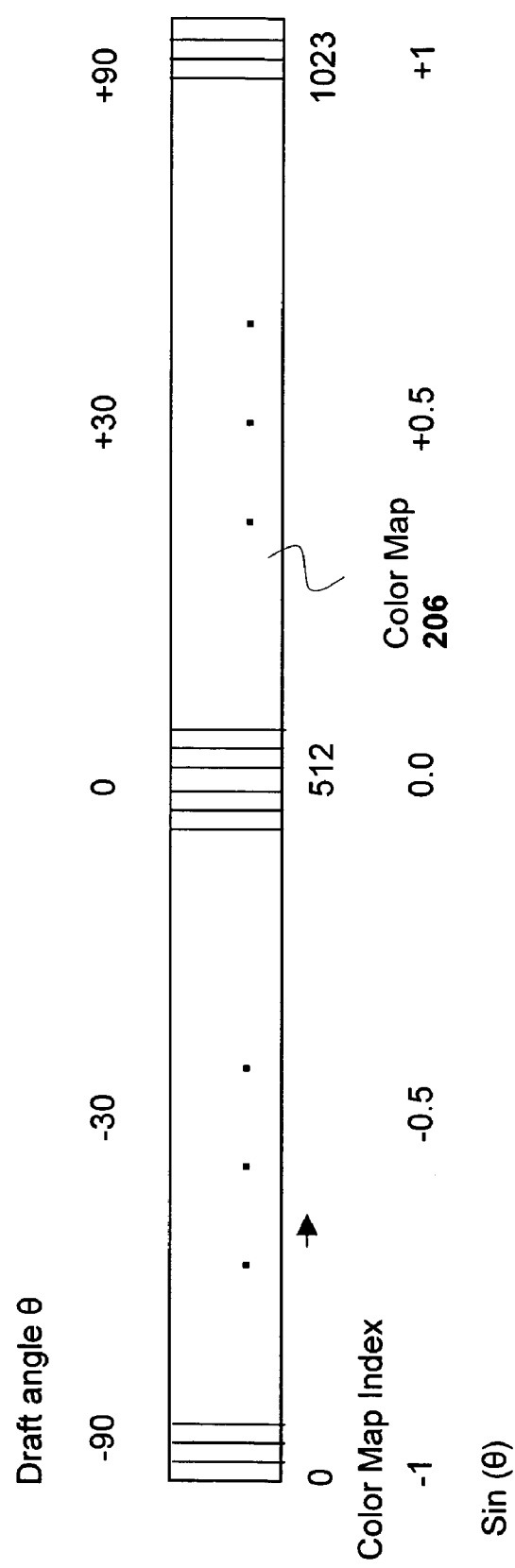
FIG. 3b illustrates a color map in accordance with one embodiment.

An example of color map 206 for 1024 pixels is illustrated in FIG. 3b. For the embodiment, color map 206 specifies a spectrum of color for various values of sin(θ), e.g. from −1 to 0 to 1. In alternate embodiments, color map 206 may be a larger map (e.g. for 2,048 pixels) or a smaller map (e.g. for 512 pixels). Color map 206 may also be based on other trigonometric values of draft angles (θ). In yet other embodiments, preferably, the color spectrum as well as the draft angle range of color map 206 may be configured by a user.

From the description to follow, the advantage flowing from the novel employment of a color map that is based on the trigonometric values of draft angles (θ) will be readily apparent to those of ordinary skill in the art.

Continuing to refer to FIG. 2, graphics services 210 are equipped to accept geometric parameter values of the various locations of the object from coloration function 204 to enable graphics services 210 to determine the trigonometric values of the draft angles (θ) of a pull direction at the various locations, for use to access color map 206 to determine the color values of the corresponding pixels of the various locations.

For example, for the earlier described color map 206 based on the sine values of draft angles (θ), coloration function 204 may provide the necessary geometric parameter values of the various locations for graphics services 210 to determine the sine values. In various embodiments, as will be described in more details below, this is effectuated by coloration function 204 providing the necessary geometric parameter values of the various locations for graphics values 210 to determine the cosine values of the complementary angles having a right angle relationship with draft angles (θ).

Accordingly, during operation, when a need to color an object to indicate the draft angles of a pull direction at the various locations of an object arises, coloration function 204 invokes the services of graphics services 210, providing graphics services 210 with the necessary parameter values to determine the trigonometric values for the various locations of the object, thereby allowing graphics services 210 to determine the appropriate color values for the pixels corresponding to the various locations of the object, using color map 206.

Referring now to FIG. 3a, wherein a more detailed illustration of a couple of draft angles, including their relationships to other geometric parameters, is shown. As earlier described, draft angle Θ 270 is the smaller angle between the pull direction 230 and a surface tangent 260. Three such draft angles are illustrated, with the draft angle on the right hand side of the figure (Position C) having a positive angle, the middle figure (Position B) having a draft angle value of about zero, and the draft angle on the left hand side of the figure (Position A) having a negative draft angle value. Complementary angle φ represents the angle between the pull direction 230 and the surface normal 280. Accordingly, angles φ and Θ have the relationship of $$\phi = 90 - \Theta$$

Thus, by virtue of the "right angle relationship", the values of sin(Θ) equal the values of cosine(φ). In other words, the values of sin(Θ) may be computed by computing the values of cos(φ).

Note that the surface normal 280 for each of the three vertices of a triangle are typically not the same, although a triangle is typically a planar figure. Thus, in one embodiment, the surface normals are not the normals to the triangle itself, but rather the normals at the vertex locations to the curved surface of which the triangle mesh is an approximation.

Still referring to FIG. 3a, cos(φ) may be computed by computing $$\cos(\phi) = \frac{N \cdot P}{|N||P|}$$

where N and P are the normal and pull direction vectors respectively, and N·P is the inner product of the N and P vectors.

If N and P are both normalized, then cos(φ) may be computed by simply computing $$\cos(\phi) = N \cdot P = Nx \cdot Px + Ny \cdot Py + Nz \cdot Pz$$

where $N_x$, $N_y$, $N_z$ and $P_x$, $P_y$, $P_z$ are components of N and P respectively.

Figure 4:
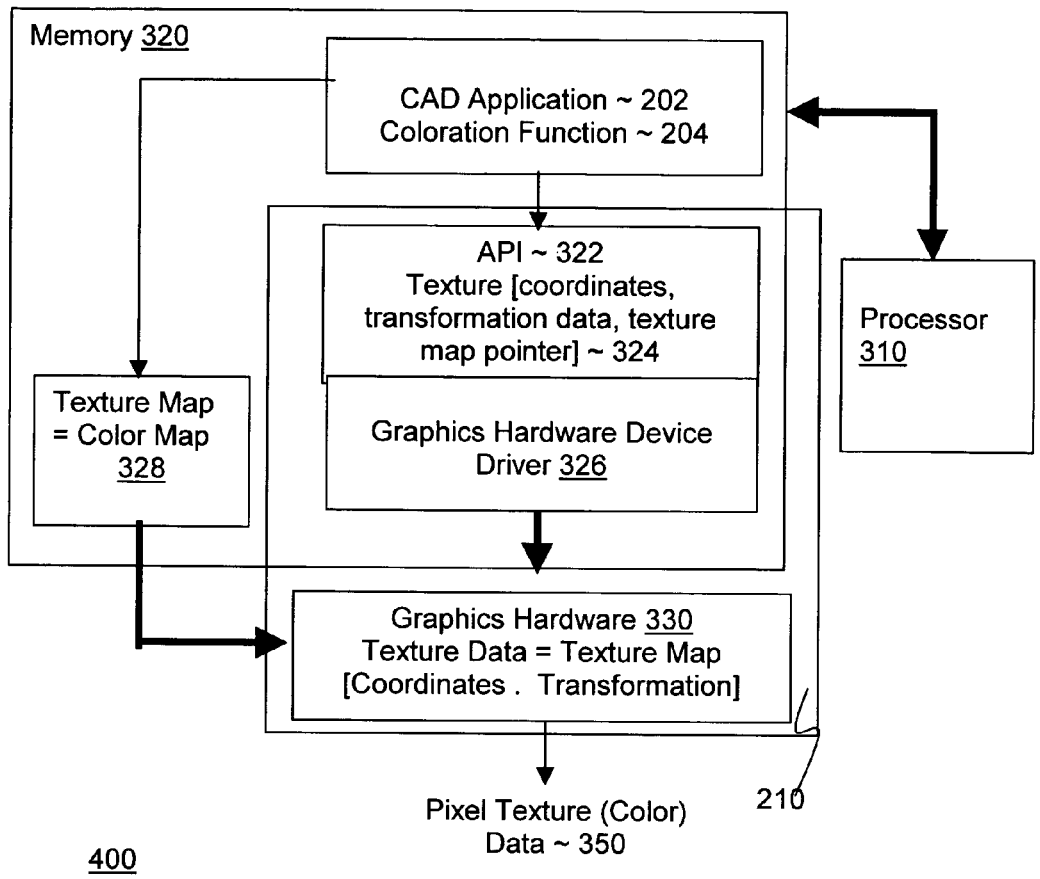
FIG. 4 illustrates another embodiment of the present invention.

FIG. 4 illustrates another embodiment of the present invention that is based on a color map specifying color values in term of values of sin(Θ), and leverages on the fact that sin(Θ) may be calculated by calculating cos(φ)=N·P=Nx·Px+Ny·Py+Nz·Pz. As illustrated, embodiment 300 (hereinafter, may also be referred as system 300) includes processor 310, memory 320 and graphics hardware 330 coupled to each other as shown. Graphics hardware 330 includes in particular the hardware for calculating the texture data for texturing a surface (e.g. a marble surface, a wood surface, a leather surface and so forth). Further, the hardware to calculate the texture data includes the hardware that applies a texture map 328 to a set of surface coordinates, with the option of applying or not applying a transformation as part of the calculation of the texture data 350. The transformation, if performed, is an inner product calculation between the surface coordinates and a transformation matrix (similar to the inner product operation that may be performed to obtain the values of cos(φ)).

Memory 320 stores the earlier described CAD application 202 and coloration function 204 adapted to take advantage of the presence of graphics hardware 320. Further, stored in memory 320 is the corresponding device driver 326 of graphics hardware 320. For the embodiment, graphics device driver 326 includes an API 322 having a texturing function 324 that allows an application to texture a surface by invoking texture function 324, supplying the coordinates of the surface, a transformation matrix, if applicable, and a pointer to the texture map 328.

In response, graphics device driver 326 causes the texture data 350 to be calculated employing graphics hardware 330.

Thus, for the embodiment, when a need arises to color an object to indicate the draft angles of the various locations of the object, coloration function 204, initializes the "texture map" with an embodiment of the above described color map, more specifically, a color map based on the sine values of draft angles (θ). Next, coloration function 204 invokes the texture function 324 with the normal components ($N_x$, $N_y$, $N_z$) of the various locations as the "texture coordinates of the surface to be textured", and the pull direction components ($P_x$, $P_y$, $P_z$) as values of the transformation matrix.

FIG. 5 illustrates the use of a transformation matrix for calculating a cosine of an angle between two vectors. A transformation matrix 510 is populated with a pull direction vector comprised of normalized pull direction components ($P_x$, $P_y$, $P_z$). A vector 520 is populated with the normalized normal components ($N_x$, $N_y$, $N_z$). The multiplication of the vector 520 and matrix 510 produces a vector 530 that contains, as an element, the same result as an inner product of the normal and pull direction vectors as described above. Thus, by populating a transformation matrix M with a pull direction unit vector, and providing a surface normal vector for a mesh vertex, a computing environment can be utilized to calculate the cosine for each mesh vertex's surface normal vector, relative to the pull direction. This, in turn, provides the sine of the angle between the pull direction and the surface tangent as previous discussed.

The texture map used may be a one-dimensional texture map and thus the texture coordinates for a corresponding texture map have an index of 0–1. However, the range of the cosine value we obtain from the inner product calculation will be in the range −1 to 1. Thus, to convert between the inner product calculation and the texture map index, the inner product value needs to be reduced by ½ and the result shifted by ½. e.g. we would like to map P·N having a [−1 . . . 1] domain to a [0 . . . 1] domain. Thus, ½(P·N) will generate the reduced cosine value. A ½ can be added to generate the necessary shift. Thus, ½(P·N)+½ will generate the proper texture coordinate, in the range [0 . . . 1], for the texture map.

Figure 6:
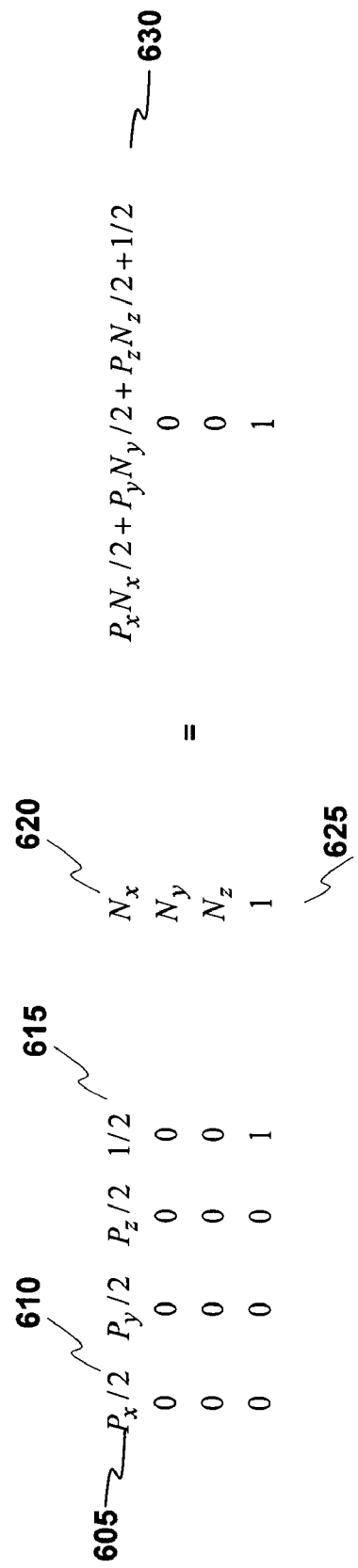
FIG. 6 illustrates utilizing matrix operations for calculating a correct texture map index, in accordance with one embodiment.

FIG. 6 illustrates utilizing matrix operations for calculating a correct texture map index, in accordance with one embodiment. Utilizing a four dimensional array, the scaling and shifting of the above operation can be performed at the time of the calculation of the inner product value. When the transformation matrix is populated with the value of the normalized pull direction components ($P_x$, $P_y$, $P_z$) 605, the values are scaled (e.g. multiplied by ½) 610 prior to being send to the transformation matrix. These values provide the scaling in the inner product calculation as discussed above. A vector 620 is populated with the normalized normal components ($N_x$, $N_y$, $N_z$). The fourth dimension of the vector 625 and the first row of the transformation matrix 615 is populated with constants to provide the shifting component of the calculation. The first term 630 in the resulting matrix provides us with a term of interest. The result:

$P_xN_x/2+P_xN_x/2+P_xN_x/2+½$ provides us with a scalar that is identical to our desired scaled and shifted value for indexing into the color map:

½($P_xN_x+P_xN_x+P_xN_x$)+½

½(P·N)+½

Thus, utilizing matrix operations available in a computing environment, the scaled and shifted inner product, representative of the draft angle, may be calculated.

Accordingly, device driver 326 causes "texture data"0 to be computed employing graphics hardware 330. However, by virtue of the data being initialized as the "texture map", and the data being supplied as the "texture coordinates" and the "transformation matrix", the resulting "texture data" are in substance the pixel color data for coloring the various locations of the object to indicate the draft angles (θ) of a pull direction at the various locations of an object.

In other words, graphics hardware 330 together with its device driver 326 (including its API 322) is substantially a hardware/software embodiment of graphics services 210 of FIG. 2.

Since graphics hardware 330 can perform these computation rapidly. The embodiment is particularly suitable to support real time re-computations of the pixel color values, in response to a user making changes to the pull direction.

Furthermore, for a mesh of a given fineness, the resulting coloration is much more accurate than what can be achieved by interpolating colors assigned to the various mesh vertices, as described earlier (page 6). Using the present method, the colors displayed at pixels within a single mesh triangle can exhibit all the color transitions required to portray the change in draft angle across that triangle, which simple color interpolation cannot do. This is because the color map is itself treated as a texture image which is mapped to the triangles comprising the surface mesh just as a texture of a physical material would be in other uses of texturing.

Processor 310, memory 320, as well as graphics hardware 320 (notwithstanding the above described requirements) represent a broad range of these elements.

Of course, in alternate embodiments, dedicated hardware substantially equivalent to the hardware provided for performing the texture data calculation may be provided to perform the pixel color value calculation directly, without having to leverage on the hardware provided for performing texture data calculation as described.

As can be seen from the above description, a novel method and apparatus for providing coloration indicative of draft angles is disclosed. The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above description.

What is claimed is:

1. In a computing environment, a method of operation comprising
receiving a pull direction of a modeled object; and
causing the modeled object to be displayed with colors to indicate draft angles relative to the pull direction at various locations of the modeled object, employing a color map specifying a spectrum of colors for a plurality of trigonometric values of draft angles.

2. The method of claim 1, wherein said causing comprises providing a plurality of geometric parameter values of the various locations of the modeled object to a set of graphics services of the computing environment, the graphics services being equipped to compute the trigonometric values of the draft angles relative to the pull direction at the various locations based at least in part on the provided geometric parameter values, and access the color map for colors to be associated with pixels corresponding to the different locations based on the computed corresponding trigonometric values.

3. The method of claim 2, wherein the trigonometric values of the draft angles comprise sine values of the draft angles.

4. The method of claim 3, wherein the geometric parameter values comprise geometric parameter values for computing cosine values of corresponding complementary angles having a right angle relationship with the draft angles.

5. The method of claim 4, wherein the geometric parameter values comprise component values of normal vectors at the various locations of the modeled objects.

6. The method of claim 5, wherein the component values of normal vectors at the various locations of the model objects are provided as texture coordinates.

7. The method of claim 4, wherein the geometric parameter values comprise component values of the pull direction vector.

8. The method of claim 7, wherein the component values of the pull direction vector are provided as a transformation matrix of a texturing operation.

9. The method of claim 4, wherein the method further comprises initializing the color map as a texture map.

10. The method of claim 1, wherein said receiving and causing are performed in real time.

11. An apparatus comprising:
storage medium having stored therein a plurality of programming instructions designed to enable the apparatus to
receive a pull direction of a modeled object, and
causing the modeled object to be displayed with colors to indicate draft angles relative to the pull direction at various locations of the modeled object, employing a color map specifying a spectrum of colors for a plurality of trigonometric values of draft angles; and
at least one processor coupled to the storage medium to execute the programming instructions.

12. The apparatus of claim 11, wherein
the apparatus further comprises a set of graphics services equipped to compute the trigonometric values of the draft angles relative to the pull direction at the various locations based at least in part on geometric parameter values of the various locations, and access the color map for colors to be associated with pixels corresponding to the different locations based on the computed corresponding trigonometric values; and
said programming instructions are designed to perform said causation by providing the plurality of geometric parameter values of the various locations of the modeled object to the graphics services.

13. The apparatus of claim 12, wherein the trigonometric values of the draft angles comprise sine values of the draft angles.

14. The apparatus of claim 13, wherein the geometric parameter values comprise geometric parameter values for computing cosine values of corresponding complementary angles having a right angle relationship with the draft angles.

15. The apparatus of claim 14, wherein the geometric parameter values comprise component values of normal vectors at the various locations of the modeled objects.

16. The apparatus of claim 15, wherein the graphics services comprises a graphics hardware equipped to texture a surface an object, and the component values of normal vectors at the various locations of the model objects are provided to the graphics services as texture coordinates.

17. The apparatus of claim 14, wherein the geometric parameter values comprise component values of the pull direction vector.

18. The apparatus of claim 17, wherein the graphics services comprises a graphics hardware equipped to texture a surface an object, and the component values of the pull direction vector are provided to the graphics services as a transformation matrix of a texturing operation.

19. The apparatus of claim 14, wherein the graphics services comprises a graphics hardware equipped to texture a surface an object, and the programming instructions are further designed to initialize the color map as a texture map.

20. The apparatus of claim 11, wherein the programming instructions are designed to perform said receiving and causing in real time.

21. An article of manufacture comprising
a machine readable medium;
a plurality of programming instructions stored on the machine readable medium, designed to enable an apparatus to
receive a pull direction of a modeled object, and
cause the modeled object to be displayed with colors to indicate draft angles relative to the pull direction at various locations of the modeled object, employing a color map specifying a spectrum of colors for a plurality of trigonometric values of draft angles.

22. The article of claim 21, wherein the programming instructions are designed to perform said causation by providing the plurality of geometric parameter values of the various locations of the modeled object to a set of graphics services, the graphics services being equipped to compute the trigonometric values of the draft angles relative to the pull direction at the various locations based at least in part on geometric parameter values of the various locations, and access the color map for colors to be associated with pixels corresponding to the different locations based on the computed corresponding trigonometric values.

23. The article of claim 22, wherein the trigonometric values of the draft angles comprise sine values of the draft angles.

* * * * *

UNITED STATES PATENT AND TRADEMARK OFFICE
CERTIFICATE OF CORRECTION

PATENT NO. : 7,068,282 B2
APPLICATION NO. : 10/676357
DATED : June 27, 2006
INVENTOR(S) : Paul Hanau It is certified that error appears in the above-identified patent and that said Letters Patent is hereby corrected as shown below:

On Title Page Item (56) References Cited, Foreign Patent Documents; Add an "A" after JP 09147144

On Title Page Item (56) References Cited, Other Publications, third listing; Replace:
"be/news/brochures/moldavisor-brochure.htm" with
-- be/news/brochures/moldavisor_brochure.htm, --

On Title Page Item (56) References Cited, Other Publications, sixth listing; Replace:
"html/DFM%20Website/cimatron-writeup.doc." with
-- html/DFM%20Website/cimatron_writeup.doc. --

Signed and Sealed this

Fourteenth Day of November, 2006

JON W. DUDAS
*Director of the United States Patent and Trademark Office*